United States Patent
Pfrenger

(10) Patent No.: US 8,936,208 B2
(45) Date of Patent: Jan. 20, 2015

(54) METHOD AND SYSTEM FOR OPERATING IRRIGATION SYSTEMS MOTORS

(75) Inventor: Jochen Pfrenger, Omaha, NE (US)

(73) Assignee: Lindsay Corporation, Omaha, NE (US)

(*) Notice: Subject to any disclaimer, the term of this patent is extended or adjusted under 35 U.S.C. 154(b) by 593 days.

(21) Appl. No.: 13/268,125

(22) Filed: Oct. 7, 2011

(65) Prior Publication Data

US 2013/0090766 A1 Apr. 11, 2013

(51) Int. Cl.
*B05B 3/00* (2006.01)
*B05B 3/18* (2006.01)
*G05D 1/02* (2006.01)
*A01G 25/09* (2006.01)

(52) U.S. Cl.
CPC ............ *G05D 1/0278* (2013.01); *A01G 25/092* (2013.01); *G05D 2201/0201* (2013.01); *G05D 1/0268* (2013.01)
USPC ........... 239/737; 239/723; 239/726; 239/728; 239/735

(58) Field of Classification Search
USPC .......................... 239/723, 726, 728, 735, 737
See application file for complete search history.

(56) References Cited

U.S. PATENT DOCUMENTS

| 5,341,995 A | 8/1994 | Leatch |
| 5,862,997 A | 1/1999 | Reinke |
| 5,927,603 A * | 7/1999 | McNabb .......................... 239/63 |
| 6,666,384 B2 * | 12/2003 | Prandi ................................ 239/1 |
| 6,755,362 B2 | 6/2004 | Krieger et al. |
| 7,156,328 B2 * | 1/2007 | Samaha ........................ 239/728 |
| 2006/0027677 A1 * | 2/2006 | Abts ................................ 239/67 |
| 2007/0267524 A1 * | 11/2007 | Mack ............................ 239/729 |
| 2011/0127344 A1 | 6/2011 | Korus et al. |

FOREIGN PATENT DOCUMENTS

WO WO9728692 A1 8/1997

* cited by examiner

*Primary Examiner* — Ryan Reis
(74) *Attorney, Agent, or Firm* — Hovey Williams LLP

(57) ABSTRACT

An irrigation system includes a central pivot and a series of mobile towers connected to the central pivot and to one another by support structure. Each mobile tower has wheels and a motor for driving at least one of the wheels. A control system operates the motors to maintain alignment of the mobile towers and the central pivot while preventing power usage of the system from exceeding a maximum power threshold. The control system determines in which sequence to operate the motors to maintain alignment of the mobile towers while operating no more than a selected number of the motors simultaneously.

17 Claims, 7 Drawing Sheets

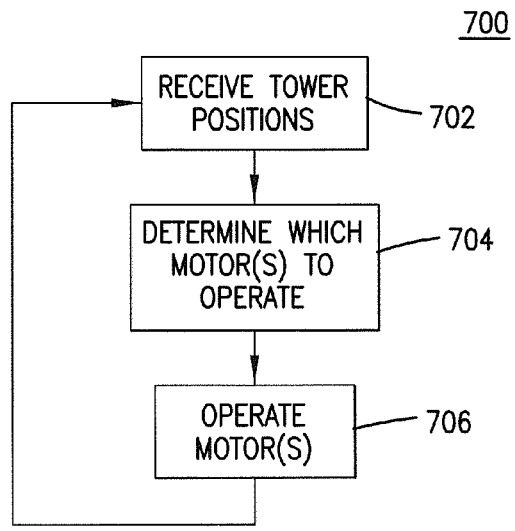
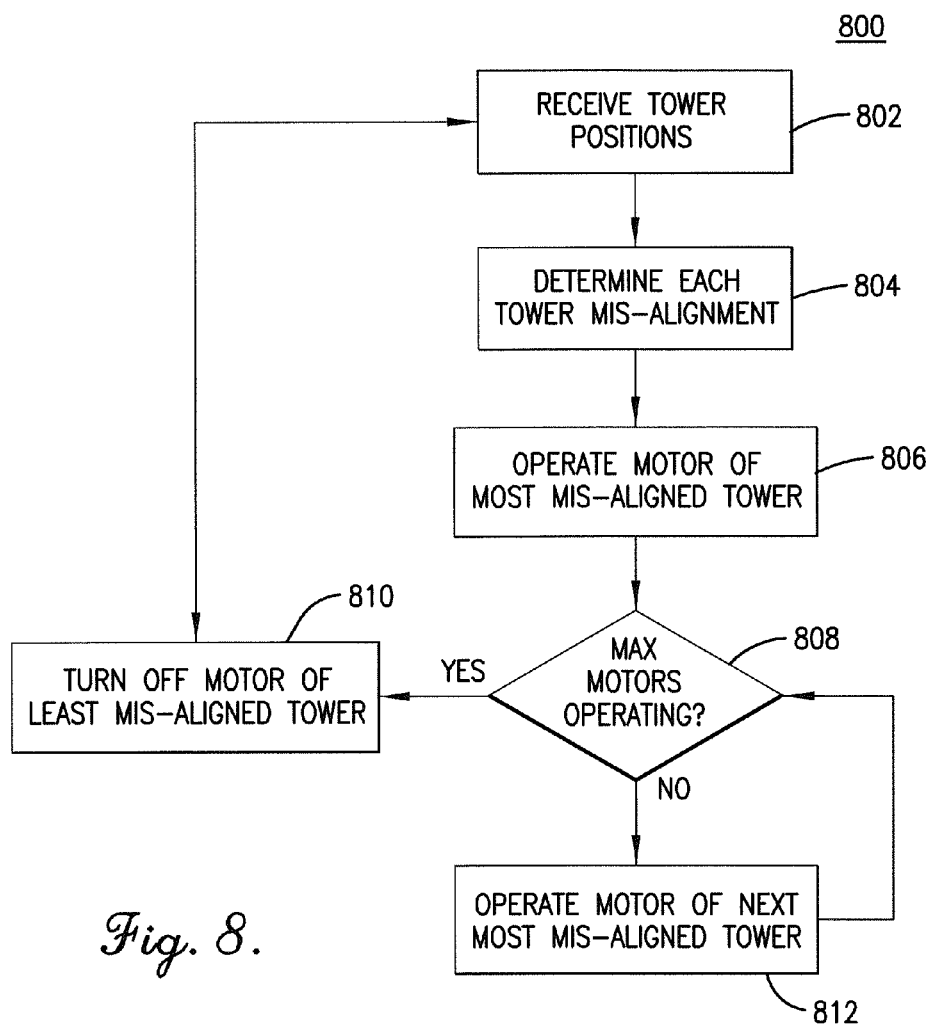

METHOD AND SYSTEM FOR OPERATING IRRIGATION SYSTEMS MOTORS

BACKGROUND OF THE INVENTION

1. Field of the Invention

The present invention relates to agricultural irrigation systems. More particularly, the invention relates to a method and system for operating the drive motors of an irrigation system to maintain alignment of the irrigation system while minimizing the system's simultaneous or peak power usage.

2. Background

Agricultural irrigation systems such as central pivot irrigation machines are commonly used to irrigate crops. A central pivot irrigation machine typically includes, among other things, a central pivot communicating with a pressurized water supply and a series of spans formed from mobile support towers connected to the central pivot and to one another by truss-type framework sections. The mobile support towers are supported on wheels that are driven by a motor on each tower. A water distribution conduit is supported by the framework sections and a number of sprinkler heads, spray guns, drop nozzles, or other fluid-emitting devices are spaced along the length of the conduit.

The mobile support towers and central pivot must stay in general alignment to prevent damage to the joints between the spans. Most known irrigation systems have mechanical mechanisms for maintaining the alignment of the spans. For example, one such mechanism includes a mechanical linkage at each span joint that operates a micro switch on its respective drive motor to turn the drive motor on and off and thus keep the span in alignment with the next span.

SUMMARY

Applicant has discovered that mechanical alignment mechanisms occasionally cause all of the drive motors to operate at the same time. For example, all the drive motors typically operate simultaneously when an irrigation system changes direction due to an obstacle or end of an area to the irrigated. Thus, the irrigation system's electrical distribution system must be designed to handle simultaneous operation of all the motors even though all the motors rarely run simultaneously during normal operation.

The present invention solves the above described problem by providing a method and system for operating the drive motors of an irrigation system to maintain alignment of the irrigation system while minimizing simultaneous power usage of the drive motors. One embodiment of the invention is an irrigation system comprising a central pivot; a series of motor-driven mobile towers connected to the central pivot and to one another by support structure; and a control system for operating the motors to maintain alignment of the mobile towers and the central pivot while preventing power usage of the irrigation system from exceeding a maximum power threshold.

An embodiment of the control system determines in which sequence to operate the motors to best maintain alignment of the mobile towers while operating no more than a selected number of the motors simultaneously. The control system may comprise a computing device and a location-determining component. The location-determining component determines a position or orientation of each of the mobile towers. The computing device determines in which sequence to operate the motors based on the position or orientation of each of the mobile towers and/or other factors and sends commands to each motor so as to maintain alignment of the irrigation system within certain tolerances while only operating a selected number of the motors concurrently.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems, but may be implemented in other types of irrigation systems including linear move irrigation systems.

BRIEF DESCRIPTION OF THE DRAWING FIGURES

Embodiments of the present invention are described in detail below with reference to the attached drawing figures, wherein:

FIG. 7 is a flow diagram depicting the steps in a method or portions of a computer program of an embodiment of the present invention.

FIG. 8 is a flow diagram depicting the steps in a method or portions of a computer program of another embodiment of the present invention.

Figure 1:
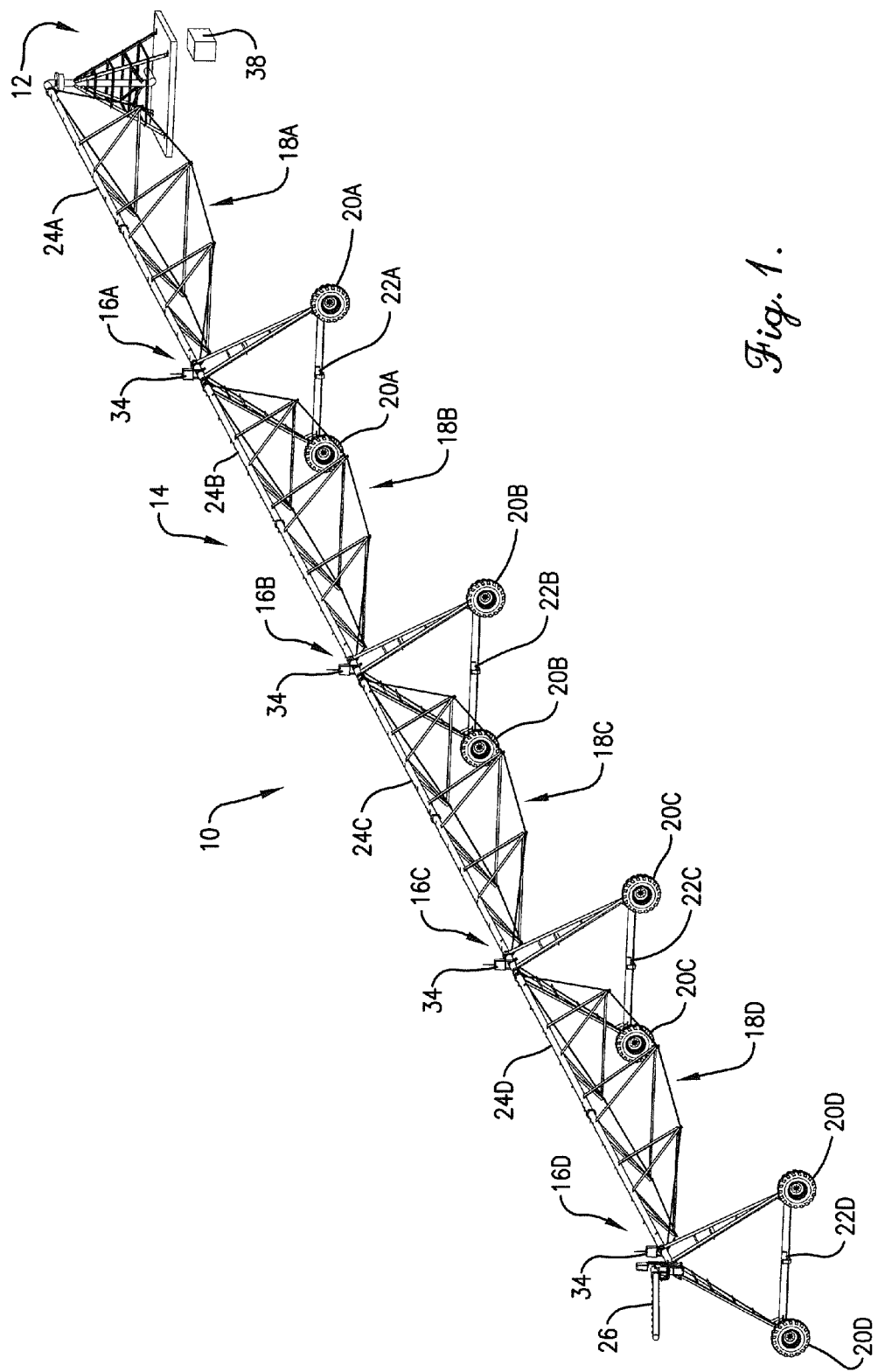
FIG. 1 is a perspective view of a central pivot irrigation system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 on which principles of the present invention may be implemented is illustrated. An embodiment of the irrigation system 10 is a central pivot irrigation system and broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise any number of mobile support towers 16A-D, the outermost 16D of which is referred to herein as an end tower. The support towers are connected to the fixed central pivot 12 and to one another by truss sections 18A-D or other supports to form a number of interconnected spans.

The mobile towers have wheels 20A-D, at least one of which is driven by suitable drive motors 22A-D. Each motor 22A-D turns at least one of its wheels 22A-D through a drive shaft to move its mobile tower and thus the main section in a circle about the central pivot to irrigate a field. The motors 22A-D may include integral or external relays so they may be turned on, off, and reversed as described below. The motors may also have several speeds or be equipped with variable speed drives.

Although not required, some or all of the towers may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 18A-D carries or otherwise supports a conduit section 24A-D or other fluid distribution mechanism that is connected in fluid communication with all other conduit sections. A plurality of sprinkler heads, spray guns, drop nozzles, or other fluid-emitting devices are spaced along the conduit sections 24A-D to apply water and/or other fluids to land underneath the irrigation system.

The irrigation system 10 may also include an optional extension arm (not shown) pivotally connected to the end tower and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 may also include one or more high pressure sprayers or end guns 26 mounted to the end tower 16D or to the end of the extension arm. The end guns are activated at the corners of a field or other designated areas to increase the amount of land that can be irrigated.

The irrigation system 10 illustrated in FIG. 1 has four mobile support towers; however, it may comprise any number of mobile support towers, truss sections, wheels, and drive motors without departing from the scope of the present invention.

The irrigation system 10 may also include a main control system for controlling movement of the mobile towers 16A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

In accordance with aspects of the present invention, the irrigation system 10 also includes a control system for maintaining alignment of the mobile towers 16A-D while minimizing simultaneous power usage of the mobile tower drive motors 22A-D. The control system can be implemented with hardware, software, firmware, or a combination thereof.

Figure 2:
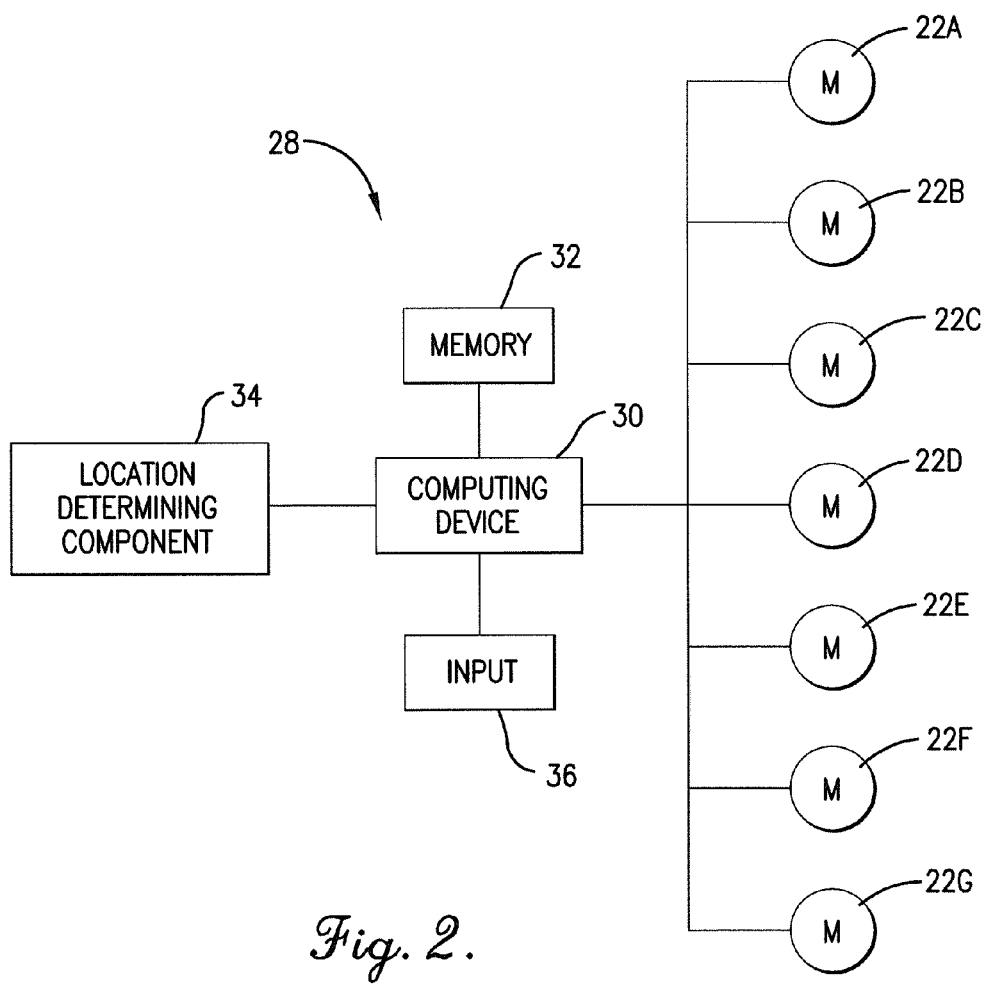
FIG. 2 is a schematic diagram of a control system constructed in accordance with an embodiment of the invention and shown coupled with a plurality of drive motors of an irrigation system such as the one shown in FIG. 1.

One embodiment of the control system 28 is illustrated in FIG. 2 and comprises a computing device 30, memory 32, at least one location-determining component 34, and one or more inputs 36. The illustrated control system 28 is shown controlling seven drive motors 22A-G for a seven span irrigation system, but as mentioned above, the irrigation system 10 may have any number of spans.

Some or all of the functionality of the control system 28 may be performed by the main control system or vice versa. In other words, the irrigation system 10 may include a separate main control system and control system 28 or a single control system that integrates some or all of the functions of the main control system and control system 28.

The computing device 30 receives inputs from other components of the control system 28 and controls operation of the drive motors 22A-G to move and align the mobile towers as explained in more detail below. The computing device 30 may comprise or include any number or combination of processors, controllers, ASICs, computers or other control circuitry. As mentioned above, the computing device 30 and other components of the control system may be part of the main control system so that a separate dedicated control system 28 is not required.

A computer program that may be implemented by the computing device may perform some of the control functions described herein. The computer program preferably comprises an ordered listing of executable instructions for implementing logical functions in the computing device. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 32 may be any electronic memory that can be accessed by the computing device and operable for storing instructions or data. For example, the memory 32 or other memory may store motor control programs for operating the motors 22A-G in particular sequences and related data as discussed in more detail below. The memory 32 may be integral with the computing device 30 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The location-determining component 34 may be any device capable of determining each mobile tower's position or orientation. The location-determining component may comprise, for example, an angle encoder positioned at the joint of each span of the irrigation system for sensing an angle between each span and the adjacent span or spans. In some embodiments, the angle encoders may be incorporated in existing articulating joints positioned between the spans so that the control system does not require its own dedicated angle encoders.

The location-determining component 34 may also be a global navigation satellite system (GNSS) receiver such as a GPS receiver, Glonass receiver, Galileo receiver, or compass system receiver attached to or near each mobile tower as illustrated in FIG. 1 and operable to receive navigational signals from satellites to calculate a position of each of the mobile towers as a function of the signals. Each GNSS receiver 34 may include one or more processors, controllers, or other computing devices and memory for storing information accessed and/or generated by the processors or other computing devices. In some embodiments, a single GNSS receiver receives satellite signals from separate antennas mounted to each mobile tower so that a receiver is not required at each tower. The GNSS receiver or receivers may be incorporated in the main control system so that the control system does not require its own dedicated GNSS receivers or may be stand-alone devices. Each GNSS receiver may be coupled with a patch antenna, helical antenna, or any other type of antenna.

The location-determining component 34 may also comprise one or more modified cam switches, proximity switches, optical encoders, potentiometers, light bar sensors, etc. at each span joint. The location-determining component 34 may also comprise other type of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

The input device 36 allows operators to input instructions into the control system 28 or otherwise operate or interact with the irrigation system. Each input device 36 may comprise any number and type of knobs, buttons, switches, dials, etc. or may be a part of a user interface such as a touchscreen display. The control system 28 may also include a display, inputs for receiving programs and data from external devices, a cellular or other radio transceiver for wirelessly receiving and transmitting data from and to remote devices, and/or other components.

Some or all of the components of the control system may be enclosed in or supported on a weatherproof housing 38 for protection from moisture, vibration, and impact. The housing 38 may be positioned anywhere on or near the central pivot 12 as illustrated in FIG. 1 and may be constructed from a suitable vibration- and impact-resistant material such as, for example, plastic, nylon, aluminum, or any combination thereof and may include one or more appropriate gaskets or seals to make it substantially waterproof or resistant.

The above-described components of the control system 28 need not be physically connected to one another since wireless communication among the various depicted components is permissible and intended to fall within the scope of the present invention.

In operation, the control system 28 monitors the position and/or orientation of the mobile towers 16A-D and selectively operates the motors 22A-D of the towers to maintain alignment of the irrigation system 10 while minimizing simultaneous power usage of the motors. The control system 28 may implement various different methods for achieving these objectives, several embodiments of which are described below.

The flow chart of FIG. 7 shows the functionality and operation of an exemplary method 700 of the present technology. Some of the blocks of the flow chart may represent a step in the method 700 and/or a module segment or portion of code of computer programs the operate the control system 28. In some alternative implementations, the functions noted in the various blocks may occur out of the order depicted in FIG. 7. For example, two blocks shown in succession in FIG. 7 may in fact be executed substantially concurrently, or the block may sometimes be executed in the reverse order depending upon the functionality involved.

The method 700 begins in step 702 where the computing device 30 receives position or orientation information for each of the mobile towers 16A-D. The position or orientation information may be obtained from the location-determining component 34 or a similar device.

In step 704, the computing device analyzes the position or orientation information for the mobile towers and determines which of the motors 22A-G to operate to maintain alignment of the towers. The computing device may consider several factors when making this determination, such as the degree of mis-alignment of each tower, the distance each tower is from the central pivot, the speed of each motor, and the maximum number of motors that may be concurrently operated given the capacity of the irrigation system's electrical distribution system and/or power source. For example, the computing device 30 may operate the motor or motors of the most mis-aligned towers first but may limit the number of motors that are operated concurrently.

In step 706, the computing device 30 selectively operates the motors in accordance with the results of step 704 so as to maintain alignment of the mobile towers. The computing device may operate the motors one at a time or may operate several of the motors concurrently up to some pre-determined maximum number of motors. The maximum number of motors that may be concurrently operated is determined by the size and/or rating of the irrigation system's electrical distribution system. In one embodiment, only three motors may be operated concurrently. In another embodiment, only two motors may be operated concurrently, and in yet another embodiment, only one motor may be operated at a time. The above described steps may be performed nearly continuously or only periodically (e.g. every 5 seconds) so as to avoid frequent cycling of the motors.

The flow chart of FIG. 8 shows the functionality and operation of another exemplary method 800 of the present technology. Some of the blocks of the flow chart may represent a step in the method 800 and/or a module segment or portion of code of computer programs. In some alternative implementations, the functions noted in the various blocks may occur out of the order depicted in FIG. 8. For example, two blocks shown in succession in FIG. 8 may in fact be executed substantially concurrently, or the block may sometimes be executed in the reverse order depending upon the functionality involved.

The method 800 begins in step 802 where the computing device 30 receives position or orientation information for each of the mobile towers 16A-D from the location-determining component 34.

In step 804, the computing device analyzes the current position or orientation information for each of the mobile towers 16A-D and compares this information to the desired position or orientation of each mobile tower to determine the degree of mis-alignment of each mobile tower. The desired position or orientation of each mobile tower that which keeps the tower in alignment with the first mobile tower 16A and may be calculated by the computing device or stored in the memory. For example, the memory 32 may include a look-up table or similar data structure that includes the desired position or orientation of every mobile tower for every position of the first mobile tower. The computing device may compare the information in this table to the actual current positions or orientations of the mobile towers to determine the degree of mis-alignment of the mobile towers. The computing device may then rank or prioritize the mobile towers based on the magnitude or degree each is mis-aligned. While prioritizing the mis-alignment of the mobile towers, the computing device may also take into account other factors such as the distance of the mobile towers from the central pivot 12. For example, the computing device may place high priority on the end tower than the second tower from the central pivot because the end tower will become mis-aligned more quickly because of its great distance from the central pivot.

In step 808, the computing device determines whether the maximum number of motors is operating. The maximum number of motors that may be concurrently operated is determined by the size and/or rating of the irrigation system's electrical distribution system. If the maximum number of motors is already operating, the method proceeds to step 810 where the computing device turns off the motor of the least mis-aligned tower whose motor is running. The method then returns to step 802 to again monitor the positions of the towers and to determine the mis-alignment of the towers as described above.

If step 808 determines that the maximum number of motors is not currently running, the method proceeds to step 812 where the computing device 30 turns on the motor of the next most mis-aligned tower whose motor is not already running. The method then returns to step 808 to again determine whether the maximum number of motors is operating. If not, the method loops between steps 812 and 808 until the maximum number of motors is running. The control system may perform these steps nearly continuously or may perform them periodically (e.g. every 5 seconds) so as to avoid frequent cycling of the motors.

Figure 3:
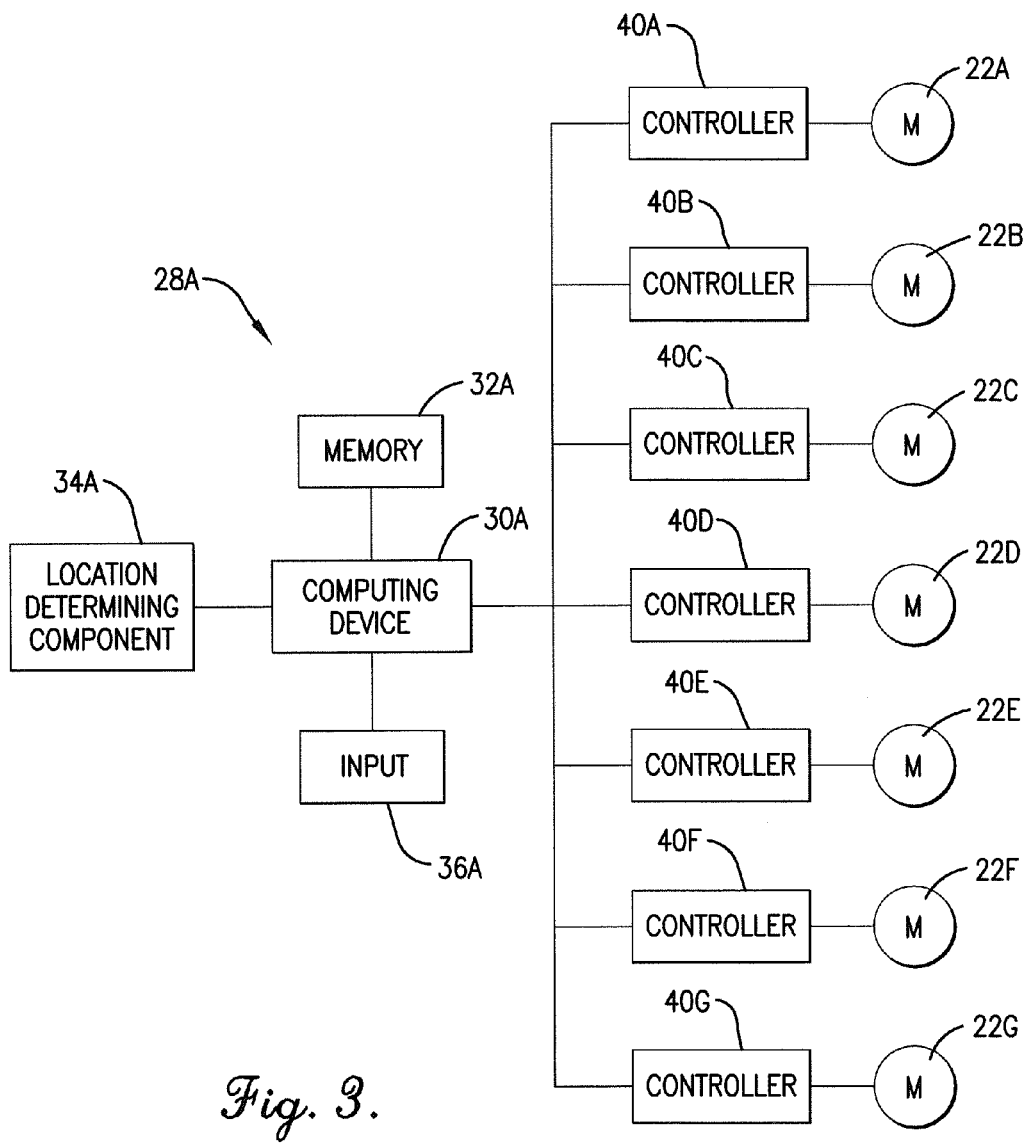
FIG. 3 is a schematic diagram of a control system constructed in accordance with another embodiment of the invention and shown coupled with a plurality of drive motors of an irrigation system.

A control system 28A constructed in accordance with another embodiment of the invention is shown in FIG. 3 and comprises a computing device 30A, memory 32A, at least one location-determining component 34A, an input 36A, and a plurality of controllers 40A-G, one coupled to each of the motors. The computing device 30A, memory 32A, location-determining component 34A, and input 36A are essentially identical to the like-numbered components described above and will therefore not be described in detail again.

Each controller 40A-G may comprise any number or combination of processors, controllers, ASICS, computers, or other central circuitry and is provided for receiving instructions from the computing device 30A and controlling activation of its motor 22A-G in response thereto. The controllers may also include variable speed drive circuitry when the motors 22A-G are variable speed motors. The purpose of the controllers 40A-40G is to distribute some of the processing requirements of the computing device 30A. For example, the computing device 30A may determine the degree of misalignment of each mobile tower and then send instructions to each controller on the amount of correction needed. Each controller may then determine how long to operate its motor, and at which speed, to re-align its mobile tower. Once a controller re-aligns its mobile tower, it may turn off its motor and send a confirmation to the computing device 30A so that the computing device may instruct another controller to re-align its mobile tower. This allows the central computing device 30A to determine which of the mobile towers are the most mis-aligned and to selectively and individually instruct the controllers to re-align the mobile towers in the order or sequence of most importance.

Figure 4:
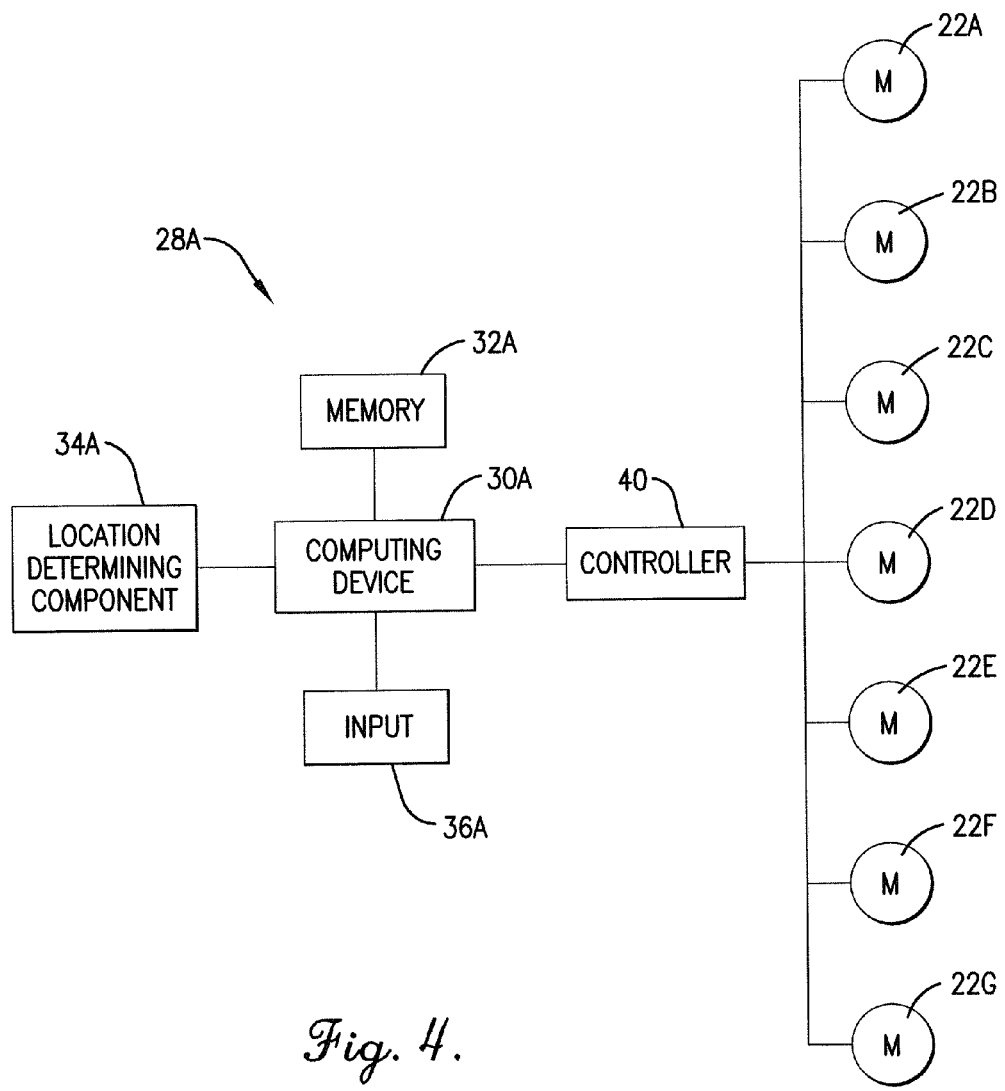
FIG. 4 is a schematic diagram of a control system constructed in accordance with yet another embodiment of the invention and shown coupled with a plurality of drive motors of an irrigation system.

Another embodiment of the control system 28A is shown in FIG. 4. This embodiment of the control system 28A is identical to the embodiment shown in FIG. 3 except that a single controller 40 replaces the controllers 40A-G. The single controller 40 may communicate with the motors 22A-G over a wired or wireless communication path.

Figure 5:
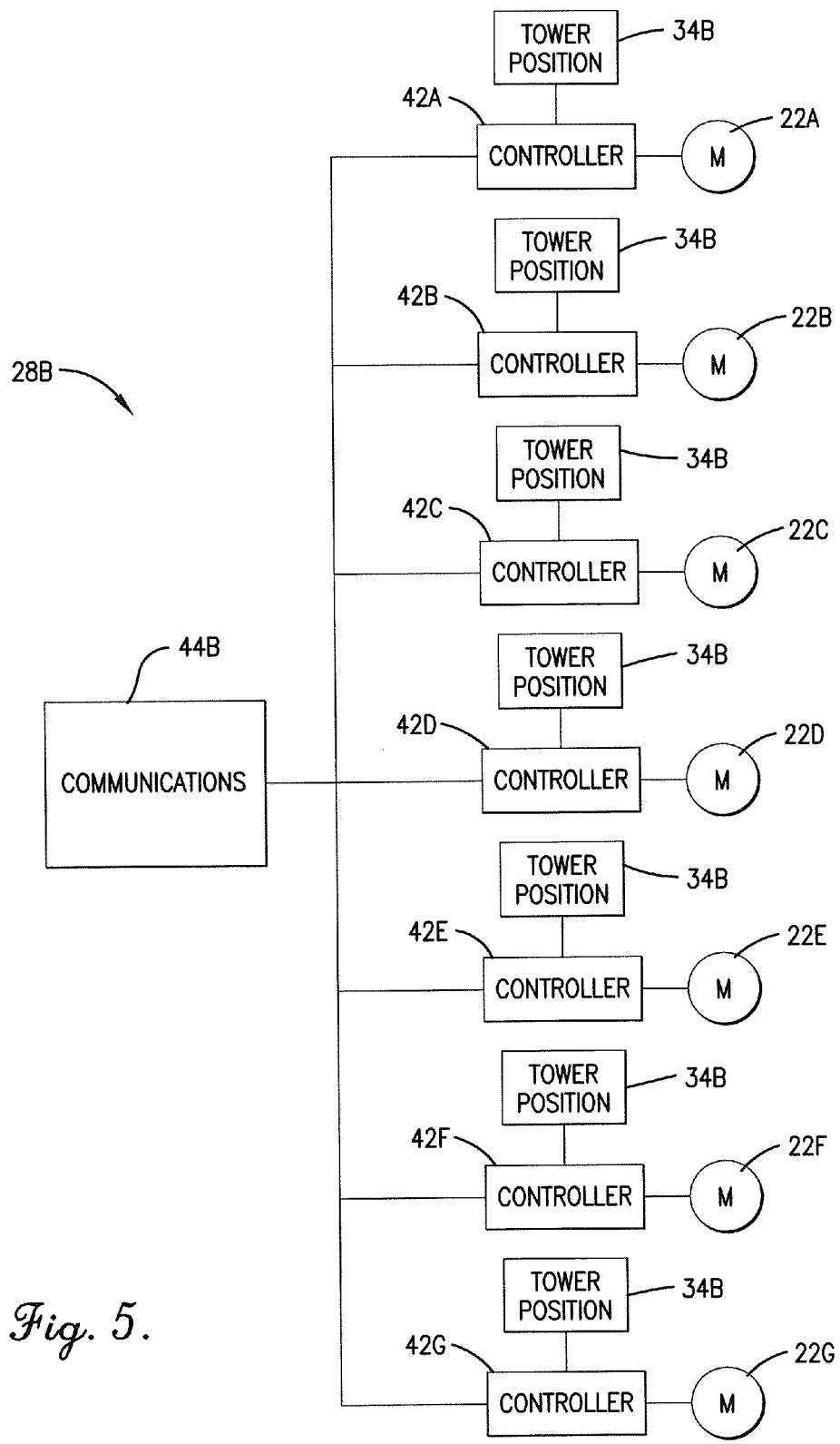
FIG. 5 is a schematic diagram of a control system constructed in accordance with yet another embodiment of the invention and shown coupled with a plurality of drive motors of an irrigation system.

A control system 28B constructed in accordance with another embodiment of the invention is shown in FIG. 5 and comprises a plurality of location-determining components, 34B, a plurality of controllers 42A-G, one coupled to each of the motors 22A-G, and a communications component 44B. In this embodiment each mobile tower has its own location-determining component and controller. No central computing device exists. Each controller may comprise any number or combination of processors, controllers, ASICS, computers, or other central circuitry and is provided for controlling activation of its motor. Each controller determines the degree of misalignment of its mobile tower and determines how long to operate its motor, and at which speed, to re-align its mobile tower. Each controller sends a confirmation to the other controllers via the communications component so that the controllers may prioritize the order of re-aligning the mobile towers. This allows the controllers to determine which of the mobile towers are the most mis-aligned and to selectively and individually instruct the motors to re-align the mobile tower in the order or sequence of most importance.

Figure 6:
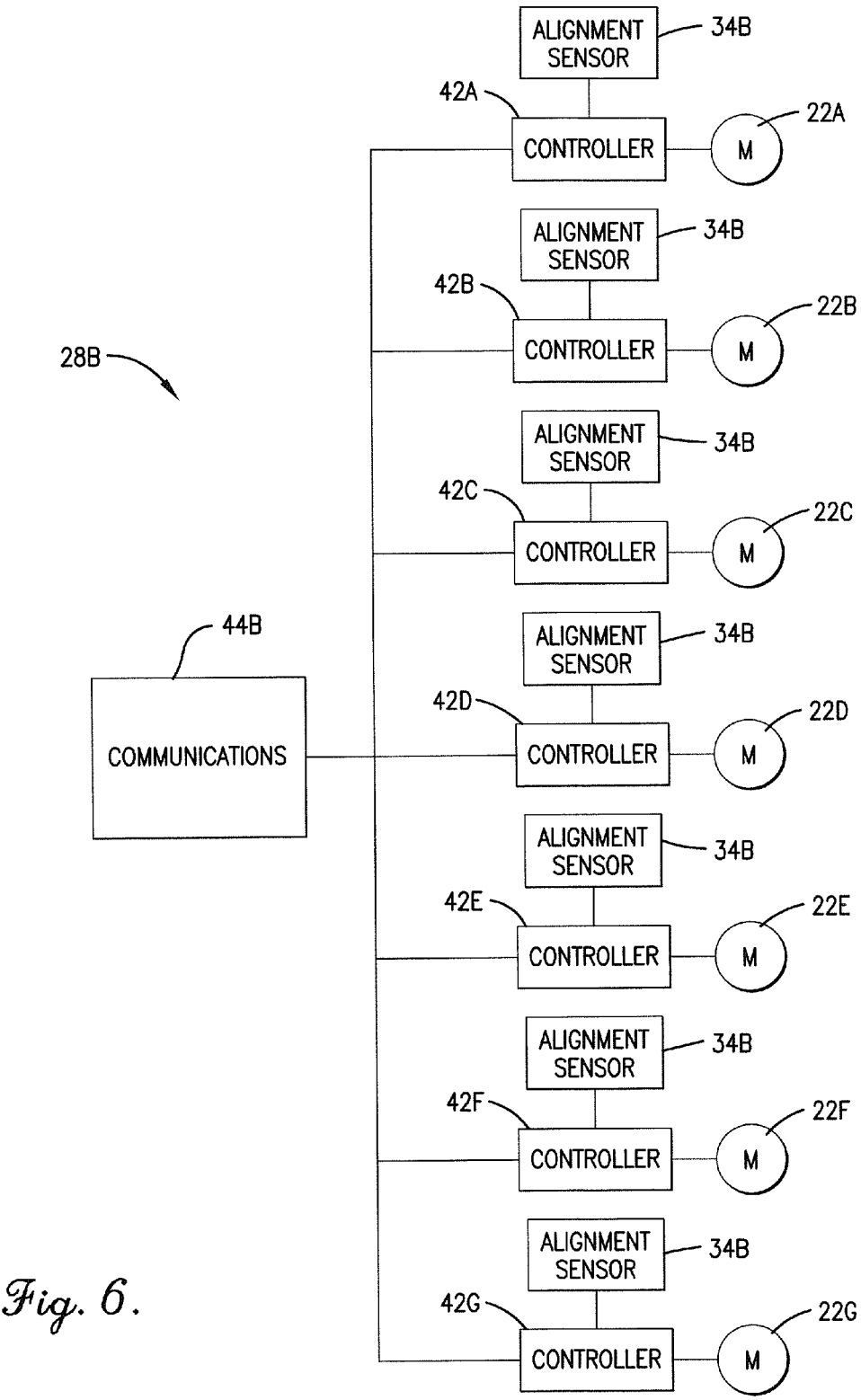
FIG. 6 is a schematic diagram of a control system constructed in accordance with yet another embodiment of the invention and shown coupled with a plurality of drive motors of an irrigation system.

Another embodiment of the control system 28B is shown in FIG. 6. This embodiment of the control system 28B is identical to the embodiment shown in FIG. 5 except that the location-determining components 34B are replaced with alignment sensors 34B that sense the alignment of the various towers to determine when to operate the motors and in what sequence. The alignment sensors may be mechanical switches, optical transmitters and receivers, and/or other conventional alignment devices.

In still other embodiments of the invention, the above-described control steps may be performed by an external computing device not located on the irrigation system. The external computing device may communicate with the drive motors and/or the controllers connected to the drive motors via wireless communication channels.

The above-described embodiments of the invention offer numerous advantages. For example, by determining which mobile towers are the most mis-aligned and then selectively operating some, but not all, of the motors to re-align the irrigation system, the present invention reduces the peak power consumption and peak current draw of the irrigation system. Thus, the irrigation system's electrical distribution system, including all power sources, incoming power lines, generators, disconnect switches, fuses, transformers, contractors, collector rings, etc. can be sized and rated for the lower peak demand, thus achieving significant cost savings.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described the preferred embodiment of the invention, what is claimed as new and desired to be protected by Letters Patent includes the following:

The invention claimed is:
1. An irrigation system comprising:
a central pivot;
a series of mobile towers connected to the central pivot and to one another by support structure, each mobile tower having wheels and a motor for driving at least one of the wheels; and
a control system for operating the motors to maintain alignment of the mobile towers and the central pivot while preventing power used by the motors to propel the mobile towers from exceeding a configurable maximum power threshold,
the control system being configured to determine in which sequence to operate the motors to maintain alignment of the mobile towers while operating at most the maximum number of motors that can be operated simultaneously without exceeding the configurable maximum power threshold, the control system comprising a computing device that turns off a motor of a least mis-aligned mobile tower whose motor is running if the maximum number of motors is already operating.

2. The irrigation system as set forth in claim 1, the control system comprising a location-determining component for determining a position or orientation of each of the mobile towers.

3. The irrigation system as set forth in claim 2, wherein the location-determining component comprises a global positioning component mounted to each of the mobile towers.

4. The irrigation system as set forth in claim 2, wherein the location-determining component comprises an angular encoder positioned at a span joint adjacent each of the mobile towers.

5. The irrigation system as set forth in claim 1, further comprising:
a water distribution conduit supported by the support structure; and
a number of fluid-emitting devices connected to the water distribution conduit.

6. The irrigation system as set forth in claim 1, wherein the computing device comprises a central computing device coupled with all the motors.

7. The irrigation system as set forth in claim 1, wherein the computing device comprises a plurality of distributable controllers, one coupled with each of the motors.

8. The irrigation system as set forth in claim 5, further comprising a main control system for controlling movement of the mobile towers and operation of the fluid-emitting devices in accordance with an irrigation control program.

9. The irrigation system as set forth in claim 8, wherein the control system is part of the main control system.

10. An irrigation system comprising:
a plurality of mobile towers, each mobile tower having wheels and a motor for driving at least one of the wheels; and
a control system for operating the motors to maintain alignment of the mobile towers while preventing power used by the motors to propel the mobile towers from exceeding a maximum power threshold, the control system including a computing device configured to:
(a) monitor the position of each mobile tower;
(b) compare the positions of the mobile towers to desired positions of the mobile towers;
(c) determine a degree of mis-alignment of each mobile tower;
(d) prioritize the mobile towers in order of decreasing degree of mis-alignment of each mobile tower;
(e) determine in which sequence to operate the motors to best maintain alignment of the mobile towers while simultaneously operating no more than a maximum number of the motors that can be operated simultaneously without exceeding the maximum power threshold;
(f) determine whether the maximum number of motors is already operating;
(g) turn off a motor of a least mis-aligned mobile tower whose motor is running if the maximum number of motors that can be operated simultaneously without exceeding the configurable maximum power threshold is already operating; and
(h) turn on a motor of a most mis-aligned mobile tower whose motor is not running if the maximum number of motors that can be operated simultaneously without exceeding the configurable maximum power threshold is not already operating,
the computing device being configured to perform steps (a)-(h) periodically no more than once per second so as to avoid frequent cycling of the motors.

11. The irrigation system as set forth in claim 10, wherein the control system is configured to perform steps (a)-(h) periodically no more than once per 5 seconds.

12. The irrigation system as set forth in claim 10, the control system comprising a location-determining component for determining a position or orientation of each of the mobile towers.

13. The irrigation system as set forth in claim 12, wherein the location-determining component comprises a global positioning component mounted to each of the mobile towers.

14. The irrigation system as set forth in claim 12, wherein the location-determining component comprises an angular encoder positioned at a span joint adjacent each of the mobile towers.

15. A method of operating an irrigation system having a plurality of mobile towers each with wheels and a drive motor for driving at least one of the wheels, the method comprising:
  (a) determining a current location or orientation of each of the mobile towers;
  (b) determining which of the motors to operate to maintain alignment of the irrigation system based on the current location or orientation of the mobile towers;
  (c) selectively operating the motors in response to step (b) while operating at most the maximum number of motors that can be operated simultaneously without exceeding a configurable maximum power threshold of power used by the motors; and
  (d) turning off a motor of a least mis-aligned mobile tower whose motor is running if the maximum number of motors is already operating.

16. The method of claim 15, wherein step (a) is performed with a global navigation satellite system (GNSS) device coupled with each mobile tower.

17. The method of claim 16, wherein step (b) is performed with a computing device that receives information from the GNSS devices.

* * * * *